United States Patent Office 3,677,697
Patented July 18, 1972

3,677,697
METHOD OF PRODUCING SODIUM PERCARBONATE
Appolinaria Vasilievna Yanush, Kharkov, U.S.S.R., assignor to Gosudarstvenny naucho-issledovatelsky i proektny Institut Osnovnoi Khimii, Kharkov, U.S.S.R.
No Drawing. Continuation of application Ser. No. 736,595, June 13, 1968. This application Oct. 7, 1970, Ser. No. 78,957
Int. Cl. C01b 15/10
U.S. Cl. 23—62   3 Claims

ABSTRACT OF THE DISCLOSURE

A method of producing sodium percarbonate by reacting sodium carbonate with hydrogen peroxide in the presence of a stabilizer wherein sodium percarbonate stabilization is effected by using benzoic acid in combination with a known stabilizing agent, e.g. a silica-containing inorganic compound.

---

This application is a continuation of application Ser. No. 736,595 filed June 13, 1968 and now abandoned.

The present invention relates to methods of producing sodium percarbonate, which can be utilized in the production of detergents, in the bleaching of fabrics, etc.

Known in the art is a method of producing sodium percarbonate which involves the reaction of powdered sodium carbonate with hydrogen peroxide in the presence of inorganic additives containing silicon dioxide, such as silicon dioxide sol, sodium silicate, magnesium silicate, followed by drying the final product.

There is also known a method of producing sodium percarbonate according to which an aqueous solution or an aqueous suspension of sodium carbonate is reacted with hydrogen peroxide in the presence of inorganic compounds containing silicon dioxide such as those described above, followed by the separation of the precipitated final product and drying thereof.

The disadvantage of the known methods consists in low stability of the product obtained. When stored under normal conditions (at room temperature and atmospheric pressure), it loses on the average not less than 0.2% active oxygen per month.

Since sodium percarbonate produced by the known methods possesses low stability, it has not found wide industrial application; instead, sodium perborate is usually employed, which loses on storage under normal conditions on the average 0.2% of active oxygen per month.

However, the starting materials used for producing sodium perborate (borax and boric acid) are much more expensive than sodium carbonate used in the production of sodium percarbonate.

Furthermore, sodium perborate usually contains less active oxygen than sodium percarbonate, the ratio being 10% versus 12.0–12.5%.

It is an object of the present invention to provide a method of producing highly stable sodium percarbonate.

This object is accomplished, according to the present invention, by the use of known stabilizers which are comprised of inorganic compounds containing silicon dioxide and a stabilizer belonging to another type of compounds. The use of such a combination of stabilizers makes it possible to bind more effectively harmful impurities such as compounds of iron, copper, manganese, lead and other heavy metals which penetrate from the starting materials and the equipment into the final product, causing it to decompose.

More precisely, the invention consists in that the interaction process between powdered sodium carbonate and hydrogen peroxide is carried out in the presence of benzoic acid in addition to the inorganic stabilizers.

Furthermore, the object stated above is accomplished by adding benzoic acid to the final product prior to its drying, when an aqueous solution or an aqueous suspension of sodium carbonate and hydrogen peroxide is used.

It is advantageous to use benzoic acid in amounts of 0.5–4.0%, preferably 1.0–3.0% by weight of sodium carbonate.

When powdered sodium carbonate is used, the method of producing sodium percarbonate is carried out in the following way.

Powdered sodium carbonate is mixed with an inorganic compound containing silicon dioxide such as sodium silicate, and with benzoic acid.

The compound containing silicon dioxide is taken in the amount of 2–5% by weight of sodium carbonate.

Benzoic acid is taken in the amount of 0.5–4.0%, preferably 1.0–3.0% by weight of sodium carbonate.

Following this, an aqueous 30–40% by weight solution of hydrogen peroxide in the amount of 1.0–1.5 g.-mole of hydrogen peroxide per 1 g.-mole of sodium carbonate is added to the mixture obtained.

It is preferable to add the hydrogen peroxide solution to the said mixture in portions: first 25% and then the rest.

The reaction between sodium carbonate and hydrogen peroxide is carried out at 30–35° C., the final product of the reaction being sodium percarbonate, which is then dried.

In order to decrease the amount of heat evolved in the reaction, powdered sodium percarbonate in an amount up to 40% by weight of the starting sodium carbonate is added to the mixture of powdered sodium carbonate, inorganic additive containing silicon dioxide and benzoic acid, prior to the addition of the hydrogen peroxide solution.

In the case where an aqueous solution or an aqueous suspension of sodium carbonate is used, the method of producing sodium percarbonate is carried out in the following way.

To the aqueous solution or aqueous suspension of sodium carbonate is added an inorganic additive containing a silicon dioxide such as sodium silicate, in the amount of 2.0–5.0% by weght of sodium carbonate.

An aqueous solution of 10–40% by weight hydrogen peroxide in the amount of 1.0–1.5 g.-mole hydrogen peroxide per 1 g.-mole sodium carbonate is added to the mixture obtained. The reaction is carried out at 35–37° C.

In order to lower the solubility of the final product in the mother liquor and to increase its yield, it is desirable to add sodium chloride to the aqueous solution or aqueous suspension of sodium carbonate prior to mixing it with the hydrogen peroxide solution.

As a result of the reaction between sodium carbonate and hydrogen peroxide, sodium percarbonate precipitates and is separated from the mother liquor by conventional methods such as centrifugal separation. To the precipitated sodium percarbonate benzoic acid is added in the amount of 0.5–4.0%, preferably 1.0–3.0%, by weight of sodium carbonate, followed by drying of the product.

The mother liquor is used for preparing the starting aqueous solutions or aqueous suspensions of sodium carbonate.

The sodium percarbonate obtained is highly stable. It loses on storage under normal conditions from 0.02 to 0.05% of active oxygen per month.

For a better understanding of the present invention the following examples of preparing sodium percarbonate are given by way of illustration.

EXAMPLE 1

4.8 kg. of powdered sodium carbonate are mixed with 0.24 kg. of aqueous sodium metasilicate, 0.06 kg. of benzoic acid and 2.5 kg. of sodium percarbonate containing 0.51 kg. of 100% hydrogen peroxide.

The mixture obtained is passed in succession through two horizontal pug mills; in the process of mixing 1.6 l. of aqueous 35% by weight hydrogen peroxide containing 389 g./l. $H_2O_2$ are added to the mixture in the first mill, and 3.8 l. of the same aqueous solution of hydrogen peroxide are added to the mixture in the second mill.

The temperature of the reaction between sodium carbonate and hydrogen peroxide is maintained at 33° C.

Sodium percarbonate coming from the second mill is dried in a fluidized bed with air heated to 70–85° C.

The weight of the dry sodium percarbonate is 9.5 kg.

The concentration of active oxygen in the final product is 12.0%.

The obtained sodium percarbonate was stored for 26 months in polyethylene bags at room temperature. The total loss of active oxygen during the entire storage period amounted to 0.52%, which means on the average 0.02% per month.

EXAMPLE 2

24.7 kg. of natural soda (sodium carbonate decahydrate) containing 32% sodium carbonate, 2.3% sodium sulfate, 64.8% water, and 0.9% of various impurities is melted. The obtained melt is heated to 60° C., and in order to remove impurities 0.43 l. of 16% aqueous solution of magnesium chloride is added thereto. The precipitated impurities are separated from the soda solution by decantation.

To 24.3 kg. of the resulting saturated aqueous solution of sodium carbonate at a temperature of 35° C. there are added 4.8 kg. of dry sodium chloride and 0.25 kg. of sodium silicate solution (sp. gr. 1.4).

This yields 29 kg. of a sodium carbonate suspension, which is poured into the reactor. Simultaneously 8.37 l. of 30% by weight solution of hydrogen peroxide containing 333 g./l. $H_2O_2$ are poured into the reactor.

The reactants are then stirred.

The heat evolved during the raction is removed from the reactor by means of a water-cooled jacket, which keeps the temperature in the reactor in the range of 35–40° C.

The formed suspension of sodium percarbonate is separated on a Nutsch filter, and 14.2 kg. of sodium percarbonate precipitate and 24.3 kg. of the mother liquor are obtained. The precipitated sodium percarbonate is mixed with 80 kg. of benzoic acid and dried in a hot air drier.

The weight of the resultant dry sodium percarbonate is 10 kg.

The product obtained was stored in polyethylene bags from 15 to 20 months at room temperature. The average loss of active oxygen was 0.04% per month.

EXAMPLE 3

To 16 l. of the mother liquor from the production of sodium percarbonate, which contains 86 g./l. of sodium carbonate and 159 g./l. of sodium chloride and is heated to 60° C. 1.6 kg. of dry sodium chloride and 0.14 l. of 20% solution of magnesium chloride are added.

The precipitate formed during the slow mixing is separated from the solution by decantation.

To 15.75 l. of purified solution 6.72 kg. of sodium carbonate and 0.25 kg. of sodium silicate solution (sp. gr. 1.4) are added, said sodium silicate solution containing not more than 0.002% of iron.

The obtained suspension of sodium carbonate is poured into the reactor simultaneously with 8.37 l. of a 30% by weight solution of hydrogen peroxide.

The reactants are then stirred.

The heat evolved during the reaction is removed from the reactor by means of a water-cooled jacket, which keeps the temperature in the reactor in the range of 35–40° C.

The precipitated sodium percarbonate is separated from the mother liquor by centrifugal separation, and then mixed with 0.24 kg. of benzoic acid and dried in a hot-air drier at 130° C.

The weight of the resultant dry sodium percarbonate is 10 kg.

The concentration of active oxygen in the final product is 12.0%.

The obtained product was stored for 15 months. The oxygen during storage was 0.04% per month.

EXAMPLE 4

The impurities in the saturated solution of sodium carbonate are removed with the aid of magnesium chloride added to the solution at 55–60° C. in the amount of 2 g. of magnesium chloride per one liter of the solution.

To 10 l. of purified solution of sodium carbonate kept at 15–20° C. within a period of 4–5 minutes 0.2 l. of an aqueous sodium silicate solution (sp. gr. 1.4) containing not more than 0.002% iron is added with stirring. This is followed by the addition of 2.41 l. of an aqueous 35% by weight solution of hydrogen peroxide which contains 94.1 g. of the 100% hydrogen peroxide.

The precipitated sodium percarbonate is separated from the mother liquor by filtering through a Nutsch filter, and 2.65 kg. of a wet precipitate and 11 l. of the mother liquor are yielded.

The wet precipitate is mixed with 0.02 kg. of benzoic acid and then dried in a fluidized bed drier with air at 75–80° C. Following this 1.88 kg. of dry sodium percarbonate containing 14% of active oxygen are obtained.

The obtained product was stored in polyethylene bags at room temperature for 20 months. The average loss of active oxygen during storage was 0.04% per month.

Though the present invention has been described in connection with a preferred embodiment, various changes and modifications may be made in carrying out the present invention without departing from the spirit and scope thereof as will be understood by those skilled in the art. These changes and modifications are to be considered as falling within the spirit and scope of the invention as defined in the appended claims.

I claim:

1. In a process in which sodium carbonate is reacted with hydrogen peroxide in the presence of an alkali metal or alkaline earth metal silicate to form sodium percarbonate, the improvement which comprises improving the stability of the percarbonate by adding 1–3% by weight benzoic acid to the precipitated percarbonate.

2. A process as claimed in claim 1 wherein the benzoic acid to be added to the precipitated percarbonate is present in the reacting step.

3. A process as claimed in claim 1 wherein the sodium carbonate is in powdered state, in suspension or in solution.

References Cited

UNITED STATES PATENTS

| | | | |
|---|---|---|---|
| 1,002,854 | 9/1911 | Liebknecht | 23—207.5 |
| 2,448,058 | 8/1948 | Slater et al. | 23—62 |
| 2,254,434 | 9/1941 | Lind et al. | 23—62 |
| 2,380,620 | 7/1945 | Walters | 23—62 |
| 3,194,768 | 7/1965 | Lindner et al. | 252—186 |

FOREIGN PATENTS

| | | | |
|---|---|---|---|
| 549,841 | 12/1942 | Great Britain | 23—62 |

OSCAR R. VERTIZ, Primary Examiner

G. O. PETERS, Assistant Examiner